United States Patent
Gao et al.

(10) Patent No.: US 9,629,025 B2
(45) Date of Patent: Apr. 18, 2017

(54) CONTROLLING DATA OFFLOAD IN RESPONSE TO FEEDBACK INFORMATION

(71) Applicant: RESEARCH IN MOTION LIMITED, Waterloo (CA)

(72) Inventors: Shiwei Gao, Nepean (CA); Yufei Wu Blankenship, Kildeer, IL (US); Rene Waraputra Purnadi, Irving, TX (US); Zhijun Cai, Euless, TX (US); Yi Song, Plano, TX (US); Changhoi Koo, Plano, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 116 days.

(21) Appl. No.: 13/886,627

(22) Filed: May 3, 2013

(65) Prior Publication Data

US 2014/0328182 A1 Nov. 6, 2014

(51) Int. Cl.
| | |
|---|---|
| *H04W 28/08* | (2009.01) |
| *H04W 28/12* | (2009.01) |
| *H04W 28/02* | (2009.01) |
| *H04W 36/04* | (2009.01) |
| *H04W 76/02* | (2009.01) |

(52) U.S. Cl.
CPC ....... *H04W 28/08* (2013.01); *H04W 28/0278* (2013.01); *H04W 28/12* (2013.01); *H04W 36/04* (2013.01); *H04W 76/025* (2013.01)

(58) Field of Classification Search
CPC . H04W 28/08; H04W 28/0278; H04W 28/12; H04W 24/10; H04W 36/22
See application file for complete search history.

(56) References Cited

U.S. PATENT DOCUMENTS

| | | | | |
|---|---|---|---|---|
| 8,243,666 | B2 * | 8/2012 | Torsner | H04L 47/30 370/329 |
| 9,516,567 | B2 * | 12/2016 | Faccin | H04W 36/14 |
| 2008/0069020 | A1 | 3/2008 | Richardson | |
| 2008/0207170 | A1 | 8/2008 | Khetawat et al. | |
| 2008/0267146 | A1 | 10/2008 | Lewis | |
| 2008/0268833 | A1 | 10/2008 | Huang et al. | |
| 2009/0040982 | A1 | 2/2009 | Ho | |

(Continued)

FOREIGN PATENT DOCUMENTS

| | | |
|---|---|---|
| EP | 2106076 | 9/2009 |
| EP | 2273804 | 1/2011 |

(Continued)

OTHER PUBLICATIONS

Gao, Shiwei; U.S. Appl. No. 13/745,051; Communicating Data Using a Local Wireless Access Network Node; filed Jan. 18, 2013 (99 pages).

(Continued)

*Primary Examiner* — Hoang-Chuong Vu
(74) *Attorney, Agent, or Firm* — Trop Pruner & Hu, P.C.

(57) ABSTRACT

A first wireless access network node receives feedback information from a second wireless access network node that performs data offload for the first wireless access node. The feedback information relates to one or more of a radio resource usage, a buffer condition, a hardware resource usage or a link quality. In response to the feedback information, the first wireless access network node performs control of the data offload.

20 Claims, 8 Drawing Sheets

(56) References Cited

U.S. PATENT DOCUMENTS

| | | | |
|---|---|---|---|
| 2009/0052350 | A1 | 2/2009 | Chen et al. |
| 2009/0232019 | A1 | 9/2009 | Gupta |
| 2009/0238207 | A1 | 9/2009 | Zhao et al. |
| 2009/0307556 | A1 | 12/2009 | Cai et al. |
| 2009/0310487 | A1 | 12/2009 | Eriksson |
| 2010/0182950 | A1 | 7/2010 | Sexton |
| 2010/0296487 | A1 | 11/2010 | Karaoguz et al. |
| 2010/0296497 | A1 | 11/2010 | Karaoguz et al. |
| 2010/0296498 | A1 | 11/2010 | Karaoguz et al. |
| 2010/0296499 | A1 | 11/2010 | Karaoguz et al. |
| 2010/0322227 | A1 | 12/2010 | Luo |
| 2011/0105144 | A1 | 5/2011 | Siomina et al. |
| 2011/0158171 | A1 | 6/2011 | Centonza et al. |
| 2011/0170506 | A1 | 7/2011 | Zisimopoulous et al. |
| 2011/0216712 | A1 | 9/2011 | Yang et al. |
| 2012/0002564 | A1 | 1/2012 | Sexton |
| 2012/0122424 | A1 | 5/2012 | Herscovici et al. |
| 2012/0214445 | A1 | 8/2012 | Stojanovski |
| 2012/0236782 | A1* | 9/2012 | Bucknell ............... H04B 7/155 370/315 |
| 2012/0252524 | A1 | 10/2012 | Gora et al. |
| 2012/0289231 | A1 | 11/2012 | Balachandran |
| 2012/0294278 | A1 | 11/2012 | Wang et al. |
| 2012/0322450 | A1 | 12/2012 | Karaoguz et al. |
| 2013/0003697 | A1* | 1/2013 | Adjakple ........... H04W 36/0011 370/331 |
| 2013/0064103 | A1* | 3/2013 | Koskela et al. ............ 370/252 |
| 2013/0084865 | A1* | 4/2013 | Agrawal et al. ............ 455/436 |
| 2013/0137469 | A1 | 5/2013 | Schmidt et al. |
| 2013/0143569 | A1 | 6/2013 | Kapoor et al. |
| 2013/0225181 | A1* | 8/2013 | Radulescu et al. ......... 455/442 |
| 2013/0225193 | A1 | 8/2013 | Lee et al. |
| 2013/0272261 | A1* | 10/2013 | Seo et al. .................. 370/329 |
| 2013/0322235 | A1* | 12/2013 | Khoryaev et al. .......... 370/229 |
| 2013/0322349 | A1* | 12/2013 | Hosangadi ........... H04L 1/0005 370/329 |
| 2013/0336270 | A1* | 12/2013 | Nagata et al. .............. 370/329 |
| 2014/0010207 | A1* | 1/2014 | Horn et al. ................. 370/332 |
| 2014/0036664 | A1 | 2/2014 | Han et al. |
| 2014/0050086 | A1* | 2/2014 | Himayat et al. ............ 370/230 |
| 2014/0148165 | A1* | 5/2014 | Serravalle et al. .......... 455/436 |
| 2014/0171091 | A1* | 6/2014 | Cai ...................... H04W 48/20 455/450 |
| 2014/0177840 | A1 | 6/2014 | Liu |
| 2014/0198643 | A1* | 7/2014 | Conway ............... H04W 24/08 370/230 |
| 2014/0204771 | A1 | 7/2014 | Gao |
| 2014/0206353 | A1* | 7/2014 | Kim ..................... H04W 36/14 455/436 |
| 2014/0211762 | A1* | 7/2014 | Bontu et al. ................ 370/332 |
| 2014/0219248 | A1 | 8/2014 | Reddiboyana et al. |
| 2014/0241262 | A1* | 8/2014 | Novak ................. H04W 72/042 370/329 |
| 2014/0254476 | A1 | 9/2014 | Blankenship |
| 2014/0269632 | A1 | 9/2014 | Blankenship |
| 2014/0301201 | A1* | 10/2014 | Ozturk et al. .............. 370/235 |
| 2014/0328326 | A1* | 11/2014 | Gunnarsson et al. ....... 370/331 |
| 2015/0009923 | A1* | 1/2015 | Lei .................... H04W 72/0413 370/329 |
| 2015/0016387 | A1* | 1/2015 | Elmdahl et al. ............ 370/329 |
| 2015/0031369 | A1* | 1/2015 | Gunnarsson et al. ....... 455/438 |
| 2015/0036659 | A1* | 2/2015 | Vesterinen et al. .......... 370/331 |
| 2015/0043369 | A1* | 2/2015 | Kim et al. .................. 370/252 |
| 2016/0080958 | A1* | 3/2016 | Rinne .................. H04W 24/10 370/338 |

FOREIGN PATENT DOCUMENTS

| | | |
|---|---|---|
| EP | 2622901 | 8/2013 |
| EP | 2753035 | 7/2014 |
| WO | 2012082023 | 6/2012 |
| WO | 2013040070 | 3/2013 |
| WO | 2013044979 | 4/2013 |
| WO | 2013053339 | 4/2013 |

OTHER PUBLICATIONS

Blankenship, Yufei Wu; U.S. Appl. No. 13/837,819; Establishing Multiple connections Between a User Equipment and Wireless Access Network Nodes; filed Mar. 15, 2013 (55 pages).

Blankenship, Yufei Wu; U.S. Appl. No. 13/789,931; Sending Data Rate Information to a Wireless Access Network Node; filed Mar. 8, 2013 (42 pages).

3GPP TS 36.331 V11.3.0; Technical Specification; 3rd Generation Partnership Project; Technical Specification Group Radio Access Network; Evolved Universal Terrestrial Radio Access (E-UTRA); Radio Resource Control (RRC); Protocol specification (Release 11); (Mar. 2013); (344 pages).

3GPP TS 36.423 V11.4.0; Technical Specification; 3rd Generation Partnership Project; Technical Specification Group Radio Access Network; Evolved Universal Terrestrial Radio Access Network (E-UTRAN); X2 application protocol (X2AP); (Release 11); (Mar. 2013); (144 pages).

3GPP TS 36.300 V11.5.0; Technical Specification; 3rd Generation Partnership Project; Technical Specification Group Radio Access Network; Evolved Universal Terrestrial Radio Access (E-UTRAN); Overall description; Stage 2; (Release 11); (Mar. 2013); (209 pages).

3GPP TS 36.321 V11.2.0; Technical Specification 3rd Generation Partnership Project; Technical Specification Group Radio Access Network; Evolved Universal Terrestrial Radio Access (E-UTRA); Medium Access Control (MAC) protocol specification (Release 11); (Mar. 2013) (56 pages).

European Patent Office, Combined Search and Examination Report for International Application No. PCT/US2013/039644; dated Jan. 2, 2014 (13 pages).

3GPP TS 36.304 V11.3.0; Technical Specification; 3rd Generation Partnership Project;Technical Specification Group Radio Access Network; Evolved Universal Terrestrial Radio Access (E-UTRA); User Equipment (UE) procedures in idle mode (Release 11); (Mar. 2013) (34 pages).

3GPP TS 33.401 V8.4.0, Technical Specification, 3rd Generation Partnership Project; Technical Specification Group Services and System Aspects; 3GPP System Architecture Evolution (SAE): Security architecture; (Release 8), Jun. 2009 (95 pages).

3GPP TR 33.821 V8.0.0, Technical Report, 3rd Generation Partnership Project; Technical Specification Group Services and System Aspects; Rationale and track of security decisions in Long Term Evolved (LTE) RAN / 3GPP System Architecture Evolution (SAE) (Release 8), Mar. 2009 (137 pages).

3GPP TS 36.300 V10.3.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Mar. 2011 (197 pages).

3GPP TS 36.331 V11.0.0, Technical Specification, 3rd Generation Partnership Project; Technical Specification Group Radio Access Network; Evolved Universal Terrestrial Radio Access (E-UTRA); Radio Resource Control (RRC); Protocol specification (Release 11), Jun. 2012 (302 pages).

"3GPP TS 36.413 V11.1.0, Technical Specification, 3rd Generation Partnership Project; Technical Specification Group Radio Access Network; Evolved Universal Terrestrial Radio Access Network (E-UTRAN);S1 Application Protocol (S1AP) (Release 11), Sep. 2012 (262 pages)".

3GPP TS 36.423 V11.2.0, Technical Specification, 3rd Generation Partnership Project; Technical Specification Group Radio Access Network; Evolved Universal Terrestrial Radio Access Network (E-UTRAN); X2 application protocol (X2AP) (Release 11), Sep. 2012 (136 pages).

3GPP TR 36.806 V9.0.0, Technical Report, 3rd Generation Partnership Project; Technical Specification Group Radio Access Network; Evolved Universal Terrestrial Radio Access (E-UTRA); Relay architectures for E-UTRA (LTE-Advanced) (Release 9), Mar. 2010 (34 pages)

(56) References Cited

OTHER PUBLICATIONS

3GPP TR 36.839 V11.1.0, Technical Report, 3rd Generation Partnership Project; Technical Specification Group Radio Access Network; Evolved Universal Terrestrial Radio Access (E-UTRA); Mobility enhancements in heterogeneous networks (Release 11), Dec. 2012 (53 pages)
3GPP TR 36.912 V11.0.0, Technical Report, 3rd Generation Partnership Project; Technical Specification Group Radio Access Network; Feasibility study for Further Advancements for E-UTRA (LTE-Advanced) (Release 11), Sep. 2012 (62 pages).
Han et al., Capacity Analysis of Generalized Distributed Wireless Communication System and Transmit Antenna Selection for Maximization of Average Capacity, IEEE 2004 (5 pages).
Vasken Genc et al., IEEE 802.16J Relay-Based Wireless Access Networks: An Overview, Oct. 2008 (8 pages).
Kerpez et al., IEEE Transactions on Vehicular Technology, vol. 45, No. 2, 265—A Radio Access System with Distributed Antennas, May 1996 (11 pages).
[Draft] 3GPP TR 36.392 V0.1.0 Technical Report 3rd Generation Partnership Project; Technical Specification Group Radio Access Network; Scenarios and Requirements for Small Cell Enhancement for E-UTRA and E-UTRAN; (Release 12) (Oct. 2012) (12 pages).
U.S. Patent Office—International Searching Authority, International Search Report and Written Opinion for PCT/US2014/010469 dated Jun. 24, 2014 (11 pages).
3GPP TSG RAN WG2 #85, R2-140413, Prague, Czech Republic, Agenda Item: 7.2.2, Source: Samsung, Title: On the UE-AMBR in Dual Connectivity, Document for: Discussion, Feb. 10 to Feb. 14, 2014 (4 pages).
3GPP TSG-RAN WG3 Meeting #79, R3-130138, St. Julian's, Malta, Agenda Item: 19, Source: NEC, Title: Consideration of the possible structures on the dual connectivity, Document for: Discussion and Decision, Jan. 28-Feb. 1, 2013 (6 pages).
3GPP TSG-RAN WG3 Meeting #83, R3-140144, Prague, Czech Republic, Agenda Item: 20.2, Source: Samsung, Title: Dual Connectivity Impact to S1/X2, Document for: Approval, Feb. 10-14, 2014 (4 pages).
3GPP TSG-RAN WG3 Meeting #83, R3-140347, Prague, Czech Republic, Agenda Item: 20.1, Source: Ericsson, Title: UE-AMBR Allocation in the context of DC scenarios, Document for: Discussions & Approval, Feb. 10-14, 2014 (6 pages).
European Patent Office, Notification of Transmittal of the International Search Report and the Written Opinion of the International Searching Authority for Int. Appl. No. PCT/US2014/021194 dated Jul. 23, 2014 (19 pages).
3GPP TS 36.300 V11.4.0 Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) (Dec. 2012) (208 pages).
3GPP TS 36.331 V11.2.0 Technical Specification, 3rd Generation Partnership Project;Technical Specification Group Radio Access Network; Evolved Universal Terrestrial Radio Access (E-UTRA);Radio Resource Control (RRC); Protocol specification (Release 11) (Dec. 2012) (340 pages).
3GPP TS 36.423 V11.3.0 Technical Specification, 3rd Generation Partnership Project; Technical Specification Group Radio Access Network; Evolved Universal Terrestrial Radio Access Network (E-UTRAN); X2 application protocol (X2AP) (Release 11) (Dec. 2012) (141 pages).
Shan-Yuan Ho, Data Fusion in a Relay Network, ISIT 2008, Toronto, Canada, Jul. 6-11, 2008 (5 pages).
David Soldani and Sudhir Dixit, Radio Communications Series, Nokia Siemens Networks Wireless, 2008 (9 pages).
3GPP TSG RAN#57 RP-121418, Chicago, US, Sep. 4-7, 2012, Source: CMCC, Title: New Study Item Proposal Scenarios and Requirements of LTE Small Cell Enhancements (6 pages).
3GPP TSG-RAN Meeting #58 RP-122032 Barcelona, Spain, Dec. 4-7, 2012 Source: Huawei, HiSilicon, CATR Title: New Study Item Proposal for Small Cell Enhancements for E-UTRA and E-UTRAN—Physical-layer Aspects (10 pages).
3GPP TSG-RAN Meeting#58 RP-122033 Barcelona, Spain, Dec. 4-7, 2012, Source: NTT DOCOMO, Inc. Title: New Study Item Description: Small Cell enhancements for E-UTRA and E-UTRAN—Higher-layer aspects (5 pages).
The International Bureau of WIPO, International Preliminary Report on Patentability for PCT/US2013/039644 dated Nov. 12, 2015 (11 pages).
European Patent Office, Communication Pursuant to Article 94(3) EPC for EP Appl. No. 13726612.8 dated Nov. 30, 2016 (6 pages).

* cited by examiner

CONTROLLING DATA OFFLOAD IN RESPONSE TO FEEDBACK INFORMATION

BACKGROUND

As the number of wireless user equipments has increased, wireless access service providers are increasingly facing challenges in meeting capacity demands in regions where the density of users is relatively high. To address capacity issues, small cells have been developed. A small cell (or multiple small cells) can operate within a coverage area of a larger cell, referred to as a macro cell. A small cell has a coverage area that is smaller than the coverage area of the macro cell.

If small cells are deployed, then communications of data with user equipments (UEs) can be offloaded from the macro cell to one or more small cells. In this way, data communication capacity can be increased to better meet data communication demands in regions of relatively high densities of UEs.

BRIEF DESCRIPTION OF THE DRAWINGS

Some embodiments are described with respect to the following figures.

DETAILED DESCRIPTION

Figure 1:
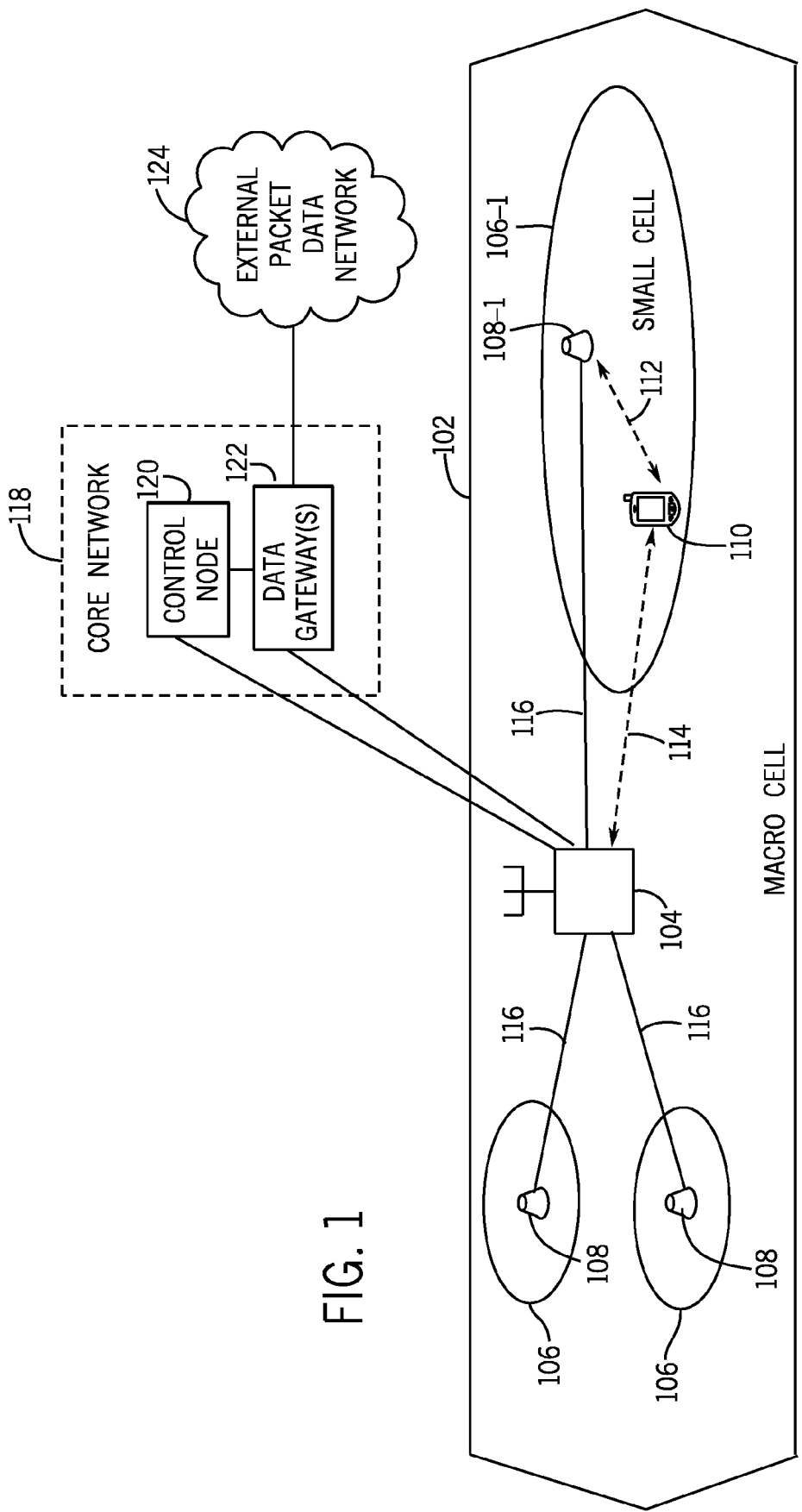
FIG. 1 is a schematic diagram of an example network arrangement that includes macro cells and small cells, in accordance with some implementations.

In a mobile communications network that includes macro cells and small cells, some user equipments (UEs) are capable of establishing multiple concurrent connections with a macro cell and one or more small cells. Concurrent wireless connections can refer to either simultaneous logical connections or simultaneous physical connections. Note that data does not have to be actively communicated at the same time over the concurrent wireless connections. Rather, concurrent wireless connections can refer to wireless connections that are concurrently set up, but which are capable of communicating data, either simultaneously or at different times.

In the ensuing discussion, a small cell refers to a cell whose coverage area is smaller than a coverage area provided by a larger cell, which is also referred to as a macro cell. A coverage area can refer to a region where mobile services can be provided by a wireless access network node of a cell to UEs that are in communications with the wireless access network node. A wireless access network node is responsible for performing wireless transmissions and receptions with UEs.

A macro cell can be considered the primary cell that communicates control plane data with UEs. Control plane data can include messages to perform various control tasks, such as any or some combination of the following: network attachment of a UE, authentication of the UE, setting up radio bearers for the UE, mobility management to manage mobility of the UE, making handover decisions based on neighbor cell measurements sent by the UE, transmission of paging messages to the UE, broadcasting of system information, control of UE measurement reporting, and so forth. Although examples of control tasks and control messages in a control plane are listed above, it is noted that in other examples, other types of control messages and control tasks can be provided by the macro cell. More generally, a control plane can perform call control and connection control functions, and can provide messaging for setting up calls or connections, supervising calls or connections, and releasing calls or connections.

A UE can perform communication of user plane data with the macro cell and small cell(s) to which the UE is connected. User plane data includes bearer data (e.g. voice data, user data, application data, etc.). User plane data can further include control data communicated between a wireless access network node and a UE, where the control data is associated with the communication of the bearer data, such as for performing flow control, error recovery, and so forth.

The macro cell is able to perform data offload to one or more small cells. Data offload refers to a first wireless access network node transferring designated user plane data to a second wireless access network node over a backhaul link, such that the designated user plane data (also referred to as "offloaded data") is communicated between the second wireless access network node and the UE, rather than between the first wireless access network node and the UE. In the typical small cell scenario, the first wireless access network node is the macro eNB, while the second wireless access network node is the small cell eNB. The UE may have simultaneous logical connections to both the macro eNB and the small cell eNB. The simultaneous logical connections can be realized by simultaneous physical connections or time-division-multiplexed physical connections. Data offload can be applied to either downlink data, or uplink data, or both downlink and uplink data. Note that the macro eNB can also perform communication of some user plane data with a UE, while offloading communication of other user plane data of the UE to one or more small cells. Generally, the macro eNB can perform data offload for a UE to one or more small cells, provided that the UE is under the coverage of each of the one or more small cells.

Various conditions of a small cell can lead to degraded communication of offloaded data between a small cell and a UE. For example, a small cell can become overloaded or congested, which can lead to reduction of the offloading capacity. For example, the reduction of the offloading capacity of the small cell can be caused by allowing the small cell to accommodate data communication with legacy UEs. Note that a legacy UE (a UE that is not capable of establishing multiple wireless connections concurrently with both macro and small cells) can connect to either a macro cell or a small cell using standard wireless connection techniques.

Alternatively, a wireless link of poor quality between a small cell and UEs served by the small cell can also cause offloaded data communication to be degraded. Degradation of user plane data communication can lead to loss of packets that contain the user plane data.

In accordance with some implementations, in response to receiving feedback information indicating that a condition is present that can cause degradation of offloaded data communication in a given small cell, a macro cell can adjust the data offload, such as by performing any or some combination of the following: (1) pause or stop the communication of at least a portion of the offloaded data to the given small cell, or (2) reduce the rate at which at least a portion of the offloaded data is communicated to the given small cell, or (3) transfer the data offload from the given small cell to a different small cell (such as one with a better wireless link quality), or (4) transfer the communication of data associated with the data offload from the given small cell back to the macro cell so that the macro cell communicates the data with the UE.

FIG. 1 illustrates an example arrangement that includes network nodes that are part of a mobile communications network that supports wireless communications with UEs. A macro cell 102 corresponds to a coverage area provided by a macro wireless access network node 104. In addition, a number of small cells 106 are depicted as being within the coverage area of the macro cell 102. Each small cell 106 corresponds to a coverage area provided by a respective small cell wireless access network node 108. One of the small cells is labeled 106-1, and the corresponding small cell wireless access network node is labeled 108-1.

Although just one macro cell 102 is shown in FIG. 1, a network arrangement can include multiple macro cells. Also, a small cell may be under the coverage of more than one macro cell. In some scenarios, a small cell may be partially out of the coverage of a macro cell.

In some examples, the frequency of a carrier used by the macro wireless access network node 104 can be lower than that of a small cell wireless access network node 108. A lower frequency allows a greater geographic reach for wireless signals transmitted by the macro wireless access network node 104. A higher frequency, on the other hand, of wireless signals transmitted by the small cell wireless access nodes 108 prevents such wireless signals from propagating great distances. As a result, small cells 106 can be deployed in relatively close proximity to each other. More generally, a small cell 106 can use a frequency that is the same or different from the frequency of the macro cell 102.

A wireless UE 110 within the coverage area of the small cell 106-1 is able to wirelessly communicate with the small cell wireless access network node 108-1. The UE 110 is also able to wirelessly communicate with the macro wireless access network node 104. Examples of the UE 110 can include any of the following: a smart phone, a personal digital assistant, a notebook computer, a tablet computer, or any other electronic device that is capable of wireless communications. It is noted that multiple UEs may be present in coverage areas of each of the small cells 106 as well as within the coverage area of the macro cell 102.

Although reference is made to macro and small cell wireless access network nodes in the present discussion, it is noted that techniques or mechanisms according to some implementations can also be applied to other types of wireless access network nodes.

The UE 110 can establish a first wireless connection 112 with the small cell wireless access network node 108-1. In addition, the UE 110 can establish a second wireless connection 114 with the macro wireless access network node 104. In such an arrangement, the UE 110 is considered to have established dual concurrent wireless connections with the macro wireless access network node 104 and the small cell wireless access network node 108-1. In further examples, the UE 110 can establish multiple concurrent wireless connections with the macro wireless access network node 104 and multiple small cell wireless access network nodes 108.

A UE that can establish multiple concurrent connections with a macro wireless access network node and one or more small cell wireless access network nodes is referred to as a "multi-connection capable UE."

FIG. 1 also shows a backhaul link 116 between the macro wireless access network node 104 and each of the small cell wireless access network nodes 108. The backhaul link 116 can include a communication link between two nodes; the backhaul link 116 can either be a direct point-to-point link or can be routed through another communication network or node. In some examples, a backhaul link 116 can be a wired link. In other examples, a backhaul link 116 can be a wireless link.

In some implementations, the macro wireless access network node 104 can provide control plane functions (e.g. mobility control function, admission control function, system information broadcast, paging, etc.) on behalf of multi-connection capable UEs within the coverage of the macro cell 102, while a small cell wireless access network node 108 provides at least a portion of the user plane functions (which involve communication of offloaded user plane data) for multi-connection capable UEs within the coverage of the small cell 106. Note that the macro wireless access network node 104 can also provide user plane functions for a multi-connection capable UE.

A small cell connection can be added to or removed from a UE under the control of the macro wireless access network node 104. In some implementations, the action of adding or removing a small cell connection for a UE can be transparent to a core network 118 of the mobile communications network. In other words, the core network 118 is not aware of the data offload performed by the macro wireless access network node 104. In further implementations, the action of adding or removing a small cell connection for a UE can be assisted by a core network; for example, the core network may switch user plane bearers of the UE to/from the small cells.

The core network 118 includes a control node 120 and one or more data gateways 122. The data gateway(s) 122 can be coupled to an external packet data network (PDN) 124, such as the Internet, a local area network (LAN), a wide area network (WAN), and so forth.

In the ensuing discussion, reference is made to mobile communications networks that operate according to the Long-Term Evolution (LTE) standards as provided by the Third Generation Partnership Project (3GPP). The LTE standards are also referred to as the Evolved Universal Terrestrial Radio Access (E-UTRA) standards.

In an E-UTRA network, a wireless access network node can be implemented as an enhanced Node B (eNB), which includes functionalities of a base station and base station controller. Thus, in an E-UTRA network, the macro wireless access network node 104 is referred to as a macro eNB, and the small cell wireless access network nodes 108 can be referred to as small cell eNBs.

In an E-UTRA network, the control node 120 of the core network 118 can be implemented as a mobility management entity (MME). An MME performs various control tasks associated with an E-UTRA network. For example, the MME can perform idle mode UE tracking and paging, bearer activation and deactivation, selection of a serving gateway (discussed further below) when the UE initially attaches to the E-UTRA network, handover of the UE between macro eNBs, authentication of a user, generation and allocation of a temporary identity to a UE, and so forth. In other examples, the MME can perform other or alternative tasks.

In an E-UTRA network, the data gateway(s) 122 of the core network 118 can include a serving gateway (SGW) and a packet data network gateway (PDN-GW). The SGW routes and forwards traffic data packets of a UE served by the SGW. The SGW can also act as a mobility anchor for the user plane during handover procedures. The SGW provides connectivity between the UE and the PDN-GW. The PDN-GW is the entry and egress point for data communicated between a UE in the E-UTRA network and a network device coupled to the PDN 124. Note that there can be multiple PDNs and corresponding PDN-GWs. Moreover, there can be multiple MMEs and SGWs in the core network 118.

Although reference is made E-UTRA in the ensuing discussion, it is noted that techniques or mechanisms according to some implementations can be applied to other wireless access technologies.

Figure 2:
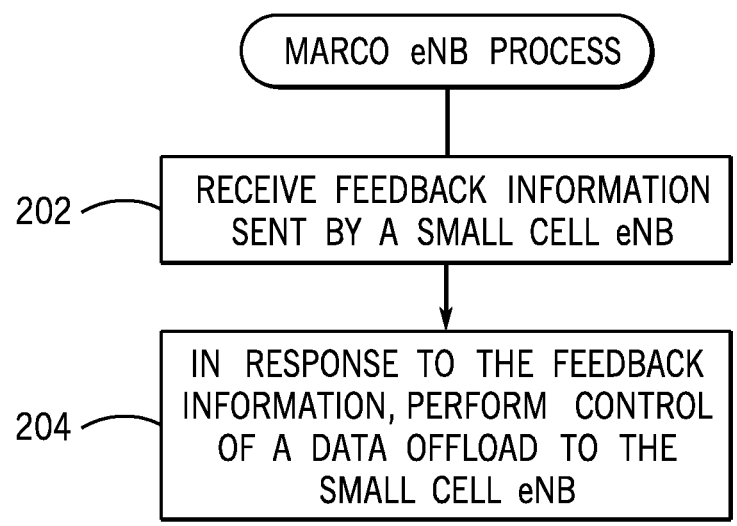
FIG. 2 is a flow diagram of a process performed by a wireless access network node, according to some implementations.

FIG. 2 is a flow diagram of a process that can be performed by a first eNB, such as the macro eNB 104 of FIG. 1. The macro eNB 104 receives (at 202) feedback information sent by a second wireless access network node, such as a small cell eNB 108, that performs data offload for the macro eNB 104. The feedback information can relate to at least one of one or more of the following: radio resource usage, a buffer condition, hardware resource usage, and a link quality.

Feedback information relating to a buffer condition can include information relating to usage of a data buffer for storing offloaded data. that is communicated by the small cell eNB. Note that the small cell can also include data buffers for storing non-offloaded data, such as data associated with legacy UEs. The data buffer can include a downlink data buffer in a small cell eNB that stores offloaded data (offloaded from the macro eNB 104 to the small cell eNB) to be transmitted from the small cell eNB to a UE or multiple UEs. The data buffer can be for a single offloaded radio bearer (discussed further below), a group of offloaded radio bearers, all offloaded radio bearers of a UE, or all offloaded radio bearers from the macro cell for more than one UE. Alternatively, the data buffer can include an uplink data buffer in the UE containing uplink data for transmission from the UE to the small cell eNB. The feedback information relating to the uplink data buffer can be reported from the UE directly to the macro eNB or through a small cell to the macro eNB. The feedback information relating to the buffer condition can relate to usage of a downlink data buffer, an uplink data buffer, or both the downlink and uplink data buffers.

Feedback information relating to radio resource usage can include information relating to usage of physical radio resources of the small cell eNB, such as over a specified period of time. Examples of physical radio resources include physical resource blocks (PRBs). A PRB can include a specified number of sub-carriers (in the frequency domain) and time slots (in the time domain). In other examples, there can be other types of physical resources. The feedback information relating to resource usage can include information relating to usage of a portion of physical resources of the small cell eNB by offloaded data, or information relating to usage of a portion of physical resources of the small cell eNB by both offloaded data and non-offloaded data (e.g. data of a UE that has established just a single connection with a small cell). The feedback information may include downlink radio resource usage information or uplink radio resource usage information or both.

Feedback information relating to hardware resource usage can include information relating to usage of hardware resources of the small cell eNB by the offloaded data from a macro cell. An example of a hardware resource includes memory of the small cell eNB, and the feedback information relating to usage of the memory can include information pertaining to either (1) an absolute amount of memory consumed by the data offload, or (2) a relative amount of memory consumed by the data offload, relative to the total amount of memory allocated for the data offload. Other hardware resources can include a processor resource, a communication resource, and so forth.

Feedback information relating to link quality can include information relating to one or more of the following: a downlink modulation and coding indicator, a downlink received signal strength indicator reported by a UE that receives offloaded data, a downlink received signal to interference plus noise ratio (SINR), an indicator of whether the estimated bit or block error rate (BER) for receiving certain downlink information such as downlink control information (DCI) may exceed a predetermined threshold, or any other indication of link quality at the small cell eNB. The downlink modulation and coding indicator provides an indication of which modulation and coding scheme is used for modulating and coding offloaded data. The received signal strength indicator is a measure of a power of a received radio frequency (RF) signal. In some examples, the feedback information can further include uplink link quality information.

In response to the feedback information, the macro eNB 104 performs (at 204) control of the data offload to the small cell eNB. The control can include adjusting the data offload, such as by pausing or stopping the sending of offloaded data to the small cell eNB, or reducing the rate of offloaded data sent to the small cell eNB, or transferring the data offload from the small cell eNB to another small cell eNB (such as one with a better wireless link quality), or transferring communication of data associated with the data offload back to the macro cell (so that the macro cell communicates the data to the UE).

In some implementations, data offload control can be performed at any of various different aggregation levels. For example, data offload control can be performed on a per radio bearer basis, on a per radio bearer group basis, on a per UE basis, or on a per small cell basis.

Different types of bearers can be provided in an E-UTRA network for carrying bearer data. An Enhanced Packet Services (EPS) bearer is established between a UE and a PDN-GW. An E-UTRAN (Evolved Universal Terrestrial Radio Access Network) Radio Access Bearer (E-RAB) transports packets of an EPS bearer between the UE and the SGW of the core network 118. A data radio bearer (DRB) transports packets of an EPS bearer between a UE and an eNB.

A radio bearer for carrying user plane data can refer to either an E-RAB or a DRB. More generally, a radio bearer can refer to any logical structure defined in a mobile communications network for carrying a flow of traffic.

Performing data offload control on a per radio bearer basis refers to performing data offload control for data carried by a particular radio bearer. Thus, in response to feedback information (as discussed above), the macro eNB 104 can perform data offload control with respect to the particular radio bearer, while leaving unchanged the data offload of other radio bearers.

Performing data offload control on a per radio bearer group basis refers to performing control of the data offload for a group of radio bearers.

Performing data offload control on a per UE basis refers to performing data offload control for all offloaded data of the UE, such as for all radio bearers of the UE.

Performing data offload control on a per small cell basis refers to performing control of the data offloads for all offloaded data communicated by the small cell, which can serve one or more UEs.

Per Radio Bearer Data Offload Control

Figure 3:
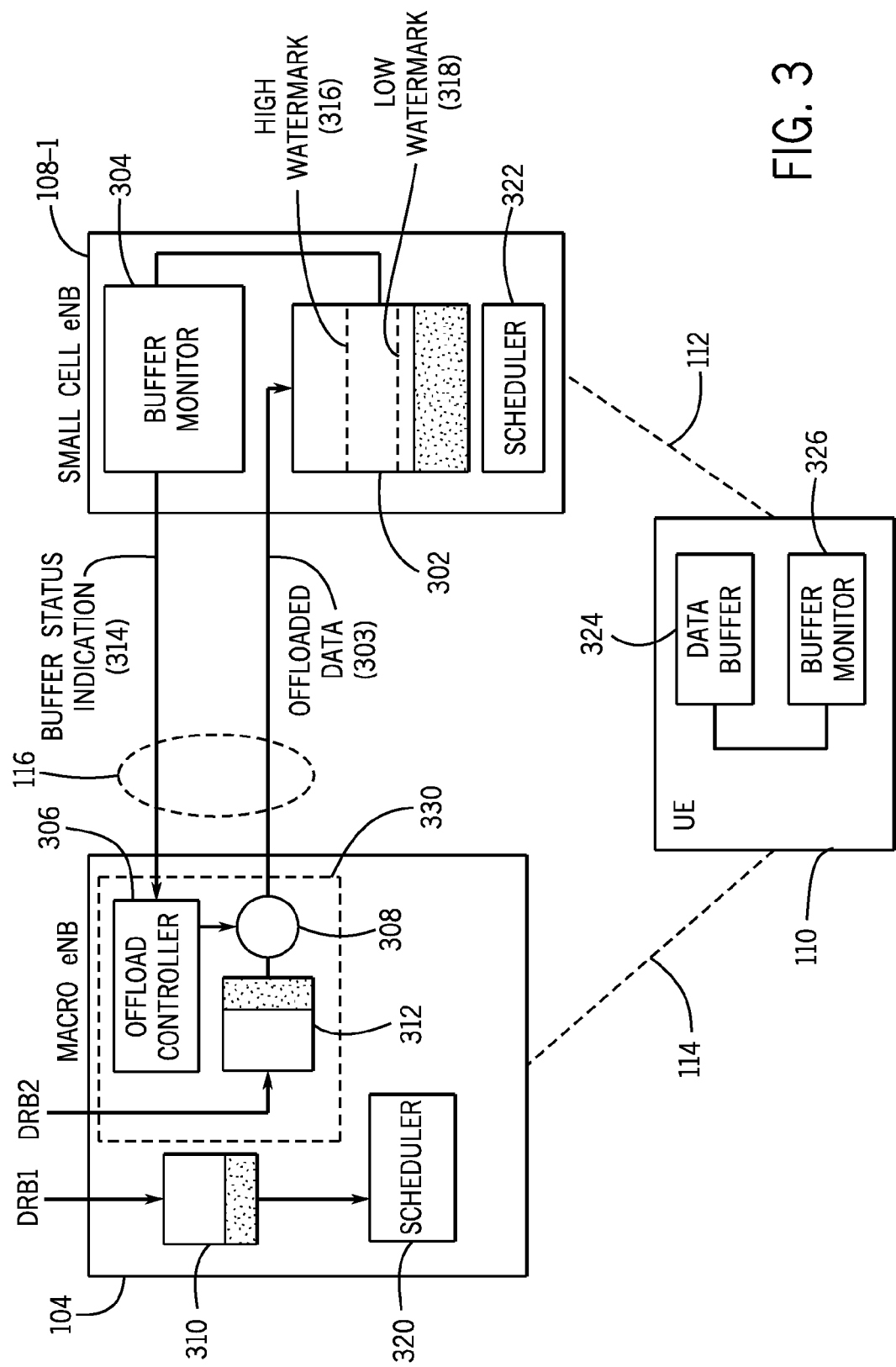
FIGS. 3-6 are schematic diagrams of example arrangements including a macro wireless access network node and a small cell wireless access network node, according to various implementations.

FIG. 3 shows an example arrangement that includes the macro eNB 104 and small cell eNB 108-1. The small cell eNB 108-1 includes a downlink data buffer 302 that is used to store data to be transmitted over the wireless connection 112 between the small cell 108-1 and the UE 110. More specifically, the downlink data buffer 302 is to store offloaded data 303 that has been sent from the macro eNB 104 to the small cell eNB 108-1 for transmission to the UE 110 on the downlink.

Although just one downlink data buffer 302 is shown in the small cell eNB 108-1, it is noted that that the small cell eNB 108-1 can include other downlink data buffer(s) for the UE 110, if the macro eNB 104 has offloaded other DRB(s) of the UE 110 to the small cell eNB 108-1. Moreover, the small cell eNB 108-1 can include data buffers for other UEs served by the small cell eNB 108-1.

In the example of FIG. 3, it is assumed that two data radio bearers (DRB1 and DRB2) have been established for carrying data to the UE 110. In the example of FIG. 3, it is assumed that DRB1 and DRB2 are downlink radio bearers for carrying traffic to the UE 110. In other examples, uplink radio bearers can be provided for carrying uplink traffic from the UE 110 to the core network 118.

The macro eNB 104 transmits data of radio bearer DRB1 over the wireless connection 114 between the macro eNB 104 and the UE 110. However, the macro eNB 104 has offloaded radio bearer DRB2 to the small cell eNB 108-1. The offload of DRB2 to the small cell eNB 108-1 is controlled by an offload controller 306 in the macro eNB 104. The offload controller 306 can be implemented with hardware, software, or a combination of both.

The offload controller 306 controls a data valve 308 to control the flow of the offloaded data 303 from the macro eNB 104 to the small cell eNB 108-1 over the backhaul link 116. The data valve 308 can include circuitry or logic (implemented in hardware or software or combination of hardware and software) to meter the transfer of offloaded data from the macro eNB 104 to the small cell eNB 108-1. The data valve 308 can adjust the rate of flow of the offloaded data 303, or can stop the flow of the offloaded data 303. Note that offload controller 306 and data valve 308 may be implemented as a single entity or even directly implemented into the data buffer 312.

The macro eNB 104 includes a data buffer 310 for radio bearer DRB1, to store data of DRB1 to be transmitted by the macro eNB 104 to the UE 110 over the wireless connection 114. The macro eNB 104 also includes another data buffer 312, which stores data of DRB2 that has been offloaded to the small cell eNB 108-1. Data in the data buffer 312 is passed through the data valve 308 to the small cell eNB 108-1, which then stores the received data of radio bearer DRB2 in the data buffer 302.

Note that the functionality included in block 330 (which includes the offload controller 306, data buffer 312, and data valve 308) can be partially or fully implemented either in the macro eNB 104, as shown, or in a network node of the core network 118 (FIG. 1). This can depend upon where in a user plane protocol stack the data offload split occurs (explained further below).

The macro eNB 104 further includes a scheduler 320 for scheduling the transmission of data in the data buffer 310 over the wireless connection 114 to the UE 110. Similarly, the small cell eNB 108-1 includes a scheduler 322 for scheduling the transmission of data in the data buffer 302 over the wireless connection 112 to the UE 110. In some examples, the schedulers 320 and 322 can be part of respective Medium Access Control (MAC) layers of the macro eNB 104 and small cell eNB 108-1, or in other protocol layers.

The small cell eNB 108-1 includes a buffer monitor 304, which is able to monitor an amount of usage of the data buffer 302. In response to detecting that usage of the data buffer 302 in the small cell eNB 108-1 has exceeded a specified threshold, the buffer monitor 304 sends a buffer status indication message 314 over the backhaul link 116 to the offload controller 306 of the macro eNB 104. In some implementations, the buffer monitor 304 sends the buffer status indication message 314 on its own initiative based on detection of usage of the data buffer 302 exceeding the specified threshold; in other words, the buffer monitor 304 does not have to wait for a request from the macro eNB 104. In other implementations, the buffer monitor 304 provides the buffer status indication message 314 in response to a request from the macro eNB 104 (as discussed further below). In some implementations, the buffer monitor 304 provides the buffer status indication message 314 periodically based on configuration information from the macro eNB 104.

The buffer status indication message 314 can indicate that usage of the data buffer 302 has exceeded the high water mark 316, or more simply, that the data buffer 302 is overloaded or congested. In a more specific example, the buffer status indication message 314 can include some or all of the following information:

UE identifier (e.g. UE's backhaul link Application Protocol ID);

Radio bearer identifier (e.g. E-RAB ID);

Buffer status (e.g. percentage of the data buffer 302 occupied);

Small cell radio resource usage (e.g. usage of physical radio resource blocks or PRBs); and Small cell hardware resource usage Wireless link quality.

In some examples, two thresholds can be specified for use by the buffer monitor 304: a high watermark 316 and a low watermark 318. In such examples, the buffer status indication message 314 is sent by the buffer monitor 304 to the offload controller 306 in response to the amount of data in the data buffer 302 exceeding the high watermark 316.

After the buffer monitor 304 has sent the buffer status indication message 314 indicating a congested condition, the buffer monitor 304 can monitor for usage of the data buffer 302 falling below the low watermark 318. If usage falls below the low watermark 318, the buffer monitor 304 can send another buffer status indication message to the macro eNB 104 to indicate that usage of the data buffer 302 has fallen below the low water mark 318 (or alternatively, that the congested condition has cleared).

The offload controller 306 in the macro eNB 104 responds to a buffer status indication message by controlling (e.g. adjusting) the data offload to the small cell eNB 108-1. For example, if the received buffer status indication message indicates a congested condition, then the offload controller 306 can perform any one or more of data offload adjustments described above. For example, the offload controller 306 can deactivate the data valve 308 to stop communication of offloaded data to the small cell eNB 108-1. Alternatively, the offload controller 306 can adjust the data valve 308 to reduce the rate of communication of the offloaded data to the small cell eNB 108-1. As yet another alternative, the offload controller 306 can transfer the data offload for DRB2 to another small cell, or alternatively, the offload controller 306 can transfer communication of data for the data offload back to the macro eNB 104 such that the macro eNB 104 communicates the data to the UE 110.

If the received buffer status indication message indicates that a congestion condition has cleared, the offload controller 306 can cause the data valve 308 to resume sending offloaded data to the small cell eNB 108-1, or to send offloaded data at a higher data rate.

FIG. 3 also shows that the UE 110 has a data buffer 324 for buffering uplink data for transmission to the small cell eNB 108-1. The UE 110 can also include another data buffer (not shown) for buffering uplink data for transmission to the macro eNB 104. Generally, different data buffers can be provided in the UE 110 for the different radio bearers established for the UE 110.

The UE 110 has a buffer monitor 326 to monitor the usage of the data buffer 324. If the usage of the data buffer 324 exceeds a specified threshold, then the buffer monitor 326 can send an uplink buffer status indication message to either the macro eNB 104 or the small cell eNB 108-1 (which can pass the uplink buffer status indication message to the macro eNB 104).

If the uplink buffer status indication message indicates that the uplink data buffer 324 is in a congested condition, then the offload controller 306 can adjust the data offload, such as by transferring the data offload from the small cell eNB 108-1 to another small cell eNB, or transferring communication of data of the data offload back to the macro eNB 104, or allowing the offload controller 306 to grant uplink resources in the macro cell and small cell for the UE accordingly. The UE can apportion the amount of uplink data for communication to the macro cell and the small cell according to the data buffer condition of the uplink data buffer to the macro cell (not shown) and the data buffer condition of the uplink data buffer 324 to the small cell. The UE can request uplink resources according to the apportioned amounts of the uplink data to the respective macro and small cells.

The thresholds (e.g. high watermark 316 and low watermark 318) used by the buffer monitor 304 in the small cell eNB 108-1 and the buffer monitor 326 in the UE 110 can be configured by the macro eNB 104 or by the small cell eNB 108-1, or specified using an operation and maintenance (O&M) procedure, based on one or more factors, such as the size of the data buffer 302, the latency of the backhaul link 116, quality-of-service (QoS) parameters associated with a radio bearer, and so forth. Alternatively, the thresholds may be represented as percentages. QoS parameters are parameters that are used for ensuring that communication of a radio bearer satisfies a specified quality target (e.g. target data rate, target packet loss rate, etc.).

Alternatively, the thresholds used by the buffer monitor 304 may be preconfigured by standards (e.g. 3GPP standards) governing operations in a mobile communications network.

In other implementations, instead of triggering the sending of buffer status indication messages based on comparing buffer usage to one or more specified thresholds, the buffer monitor 304 can instead report buffer status indication messages periodically.

In some implementations, data offload control by the offload controller 306 in response to buffer status indication messages can also consider QoS properties of respective radio bearers. An example QoS property is whether or not a radio bearer is a Guaranteed Bit Rate (GBR) bearer or a non-GBR bearer. Data of a GBR bearer is communicated to conform to a guaranteed bit rate, which is the bit rate that is expected to be provided for the GBR bearer. A non-GBR bearer, on the other hand, is not associated with a guaranteed bit rate.

When the offload controller 306 of the macro eNB 104 receives a buffer status indication message indicating a congested condition, the offload controller 306 may take different actions based on a QoS property of the affected radio bearer. In one example, the offload controller 306 may stop sending offloaded data associated with the affected radio bearer to the small cell if the radio bearer is a non-GBR bearer. On the other hand, if the affected radio bearer is a GBR bearer, then the offload controller 306 may continue sending the offloaded data of the GBR bearer to the small cell eNB 108-1, or alternatively, the offload controller 306 may decide to switch the GBR bearer to another small cell or back to the macro cell.

In further examples, to reduce the signaling over the backhaul link 116, offload control can be performed on a selected subset of bearers, such as on just non-GBR bearers or on just GBR bearers. In this case, offload control messages do not have to be communicated over the backhaul link 116 for radio bearers that are not subject to offload control in response to a buffer usage exceeding a specified threshold.

In other examples, if the offload controller 306 decided to stop or slow down communication of offloaded data to the small cell eNB 108-1 in response to a first buffer status indication message indicating a congested condition, the offload controller 306 can start a timer. The timer has a specified expiration time period. Once the timer is started, the timer counts for the specified expiration time period, at which point the timer is considered to have expired.

If the timer expires before receiving a second buffer status indication message indicating that the congested condition indicated by the first buffer status indication message has cleared, the offload controller 306 can remove the radio bearer from the small cell eNB 108-1 and transfer the radio bearer to another small cell or back to the macro cell. However, if the second buffer status indication message is received prior to timer expiration, offload controller 306 resets the timer. In response to the second buffer status indication, the offload controller 306 can resume sending offloaded data to the small cell eNB 108-1 or can increase the data rate at which offloaded data is sent to the small cell eNB 108-1.

In some examples, the specified expiration time period can be configured by the small cell eNB 108-1 or by the macro eNB 104. In examples where the specified expiration time period is configured by the small cell eNB 108-1, information pertaining to the specified expiration time period can be appended to a buffer status indication message sent by the small cell eNB 108-1 to the macro eNB 104.

The various data buffers 302, 310, 312, and 324 depicted in FIG. 3 can be part of respective protocol layers of respective nodes, including the small cell eNB 108-1, macro eNB 104, and UE 110. Protocol layers are included in a protocol stack of each of the nodes, and are to provide specified procedures for performing communications. For example, a protocol stack can include a physical layer that provides networking hardware for transmitting signals over a wireless link, a MAC layer that provides addressing and channel access control mechanisms, a radio link control (RLC) layer, and a Packet Data Convergence Protocol (PDCP) layer. The PDCP layer is above the RLC layer, which is above the MAC layer.

The PDCP layer can provide some of the following functionalities in the user plane: header compression and decompression; in-sequence delivery of upper layer packet data units (PDUs); duplicate detection of lower layer service data units (SDUs); retransmission of PDCP SDUs; and so forth.

The RLC layer can provide some of the following example functionalities: transfer of upper layer PDUs; error correction, such as by using Automatic Repeat reQuest (ARQ); concatenation, segmentation, and reassembly of RLC SDUs; reordering of RLC data PDUs; and so forth.

The data buffers 302, 310, and 324 can be part of any of the MAC, RLC, or PDCP layers, or another protocol layer.

In the example of FIG. 3 (as well as in other examples discussed in this disclosure), it is assumed that data offload control is based on buffer status. In other implementations, data offload control can alternatively or additionally be based on other conditions, such as wireless link quality and radio resource usage, as reported by the small cell eNB 108-1 or UE 110, or both, to the macro eNB 104.

Per Radio Bearer Group Offload Control

The foregoing describes offload control on a per radio bearer basis. In alternative implementations, offload control can be performed on the basis of a radio bearer group, which can include multiple radio bearers. Performing per radio bearer group offload control can reduce signaling overhead over the backhaul link 116. In some examples, radio bearer groups can be defined by the macro eNB 104. Alternatively, radio bearer groups can be defined by a core network node. The radio bearer groups can be updated from time to time.

Figure 4:
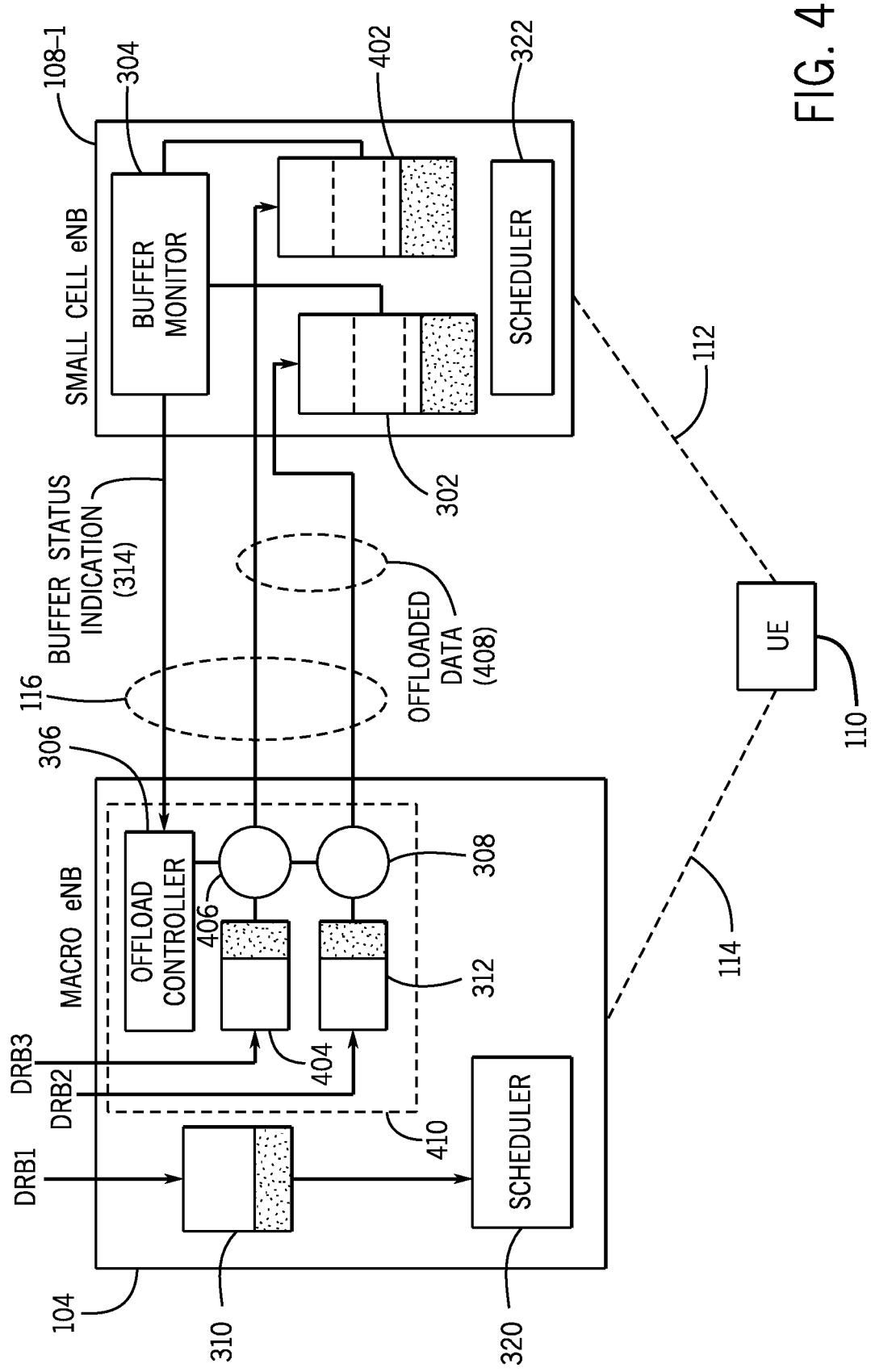

FIG. 4 shows an alternative example arrangement in which two radio bearers DRB2 and DRB3 have been offloaded by the macro eNB 104 to the small cell eNB 108-1. Elements that are similar to those depicted in FIG. 3 are assigned the same reference numerals. The small cell eNB 108-1 includes two data buffers 302 and 402 for storing offloaded data associated with DRB2 and DRB3. The macro eNB 104 similarly includes data buffers 312 and 404 for storing data of DRB2 and DRB3, which are transferred through respective data valves 308 and 406 as offloaded data 408 over the backhaul link 116 to the small cell eNB 108-1. The data valves 308 and 406 are controlled by the offload controller 306.

Note that the functionality indicated in block 410 (which includes the offload controller 306, data buffers 312 and 404, and data valves 308 and 406) can be partially or fully implemented either in the macro eNB 104, as shown, or in a network node of the core network 118 (FIG. 1). This can depend upon where in a user plane protocol stack the data offload split occurs (discussed further below).

In the example of FIG. 4, it is assumed that DRB2 and DRB3 form a radio bearer group. Grouping of radio bearers can be based on one or more criteria. For example, radio bearers having similar QoS properties can be grouped together. As noted above, one such QoS property is whether or not a radio bearer is associated with a guaranteed bit rate. GBR bearers of a UE (or multiple UEs) may be grouped into a first radio bearer group, while non-GBR bearers of the UE (or multiple UEs) may be grouped into a second radio bearer group. Another property of radio bearers that can be used for grouping is a QoS Class Identifier (QCI) of each radio bearer. Radio bearers having the same QCI can be bundled into a same group. As another example, a delay requirement can be used as a criterion to form radio bearer groups. Radio bearers of the same (or similar) delay requirement can be bundled into the same group. In other examples, other types of radio bearer groups can be provided.

In the example of FIG. 4, if usage of either the data buffer 302 or 402 associated with a respective radio bearer (e.g. DRB2 and DRB3, for example) of a radio bearer group exceeds a specified threshold (e.g. a high watermark), the buffer monitor 304 can send a buffer status indication message 314 to the macro eNB 104 to indicate a congested condition associated with a specific DRB. The buffer monitor 304 can also monitor for buffer usage of the data buffers 302 and 402 falling below a specified threshold, such as the low watermark discussed above.

In addition, similar to the arrangement of FIG. 3, the UE 110 in the FIG. 4 example can also send indications of usage of any uplink data buffer associated with a radio bearer group.

In the FIG. 4 example, the buffer status indication message can include one or more of the following information:
UE identifier;
Radio bearer group identifier;
Buffer status;
GBR bearer status, e.g. number of GBR bearers in the group, QCI of the GBR bearers, and radio resource usage of the GBR bearers;
Small cell radio resource usage;
Small cell hardware resource usage; and
Wireless link quality.

When the offload controller 306 of the macro eNB 104 receives a buffer status indication message indicating a congested condition associated with at least one data buffer associated with any radio bearer of a particular radio bearer group, the offload controller 306 can adjust data offload for the particular radio bearer group. The offload controller 306 has the ability to select which radio bearer(s) of the radio bearer group to stop, slow down, or switch to another small cell or back to the macro cell. In another alternative, the offload controller 306 may slow down all radio bearers in the radio bearer group equally or proportionally.

In some examples, the offload controller 306 can also use a timer, similar to the manner as discussed above, to trigger the switching of a radio bearer group from one small cell to another small cell.

Per UE Offload Control

To further reduce signaling overhead over the backhaul link 116, the offload control may be done at a per UE basis. In this case, a buffer status indication message is sent to the macro eNB 104 when any data buffer in the small cell eNB 108-1 associated with a UE exceeds a specified threshold (e.g. high watermark as discussed in connection with FIG. 3 above). Similarly, a buffer status indication message can be sent by the UE 110 to the macro eNB 104 or small cell eNB 108-1 if any uplink data buffer in the UE 110 exceeds a specified threshold.

In some examples, the status indication message for per UE offload control can include one or more of the following:
UE identifier;
Buffer status;
GBR bearer status, e.g. number of GBR bearers for the UE and radio resource usage of the GBR bearers;
Small cell radio resource usage;
Small cell hardware resource usage; and
Wireless link quality.

When the offload controller 306 of the macro eNB 104 receives a buffer status indication message from the small cell eNB 108-1 indicating a congested condition, the offload controller 306 can apply data offload control to a selected at least one radio bearer of the UE 110, such as a non-GBR bearer data packets associated with the UE 110, or the offload controller can reduce the rate for all non-GBR bearers equally or proportionally. The offload controller 306 may continue to send GBR data packets to the small cell eNB 108-1, possibly at minimum guaranteed bit rates. In other examples, data offload control can be applied to all radio bearers of the UE 110 in response to the buffer indication message indicating a congested condition.

As the downlink and uplink traffic pattern can be different within a small cell, the uplink and downlink data offload of a given UE can be controlled independently. Uplink traffic can be controlled in a more dynamic fashion, as the transmitter (i.e. the UE) is the same regardless of which wireless connection (to the macro eNB or small cell eNB) is utilized. The UE can autonomously apportion the uplink data to the macro cell and the small cell according to the radio bearer condition to the macro eNB and to small cell eNB.

In some examples, the offload controller 306 can also use a timer, similar to the manner as discussed above, to trigger the switching of selected one or more radio bearers of the UE 110 from one small cell to another small cell.

Per Small Cell Small Offload Control

Alternatively, offload control is performed for all DRBs offloaded to a small cell. The small cell eNB 108-1 may provide a buffer status indication message to the macro eNB 104 when the buffer monitor 304 detects that usage of any data buffer at the small cell eNB 108-1 (for any UE having DRB(s) offloaded to the small cell) exceeds a specified threshold. Alternatively, the buffer status indication message can be sent in response to the buffer monitor 304 detecting that average usage of the data buffers at the small cell eNB 108-1 (for all UEs having DRB(s) offloaded to the small cell) exceeds a specified threshold. In other examples, a buffer status indication message can be sent in response to detecting a rate of packet drops in the small cell exceeding a specified threshold.

When the offload controller 306 of the macro eNB 104 receives a buffer indication message indicating a congested condition, the offload controller 306 can decide not to perform any data offloading to the small cell eNB 108-1 or slow down the rate for certain radio bearers based on the QCI and delay requirements. If there are ongoing data offloads (associated with one or multiple UEs) to the small cell eNB 108-1, the offload controller 306 can decide to cancel the ongoing data offloads and switch the data offloads for the UE(s) served by the small cell eNB 108-1 to another small cell or transfer communication of data associated with the data offloads back to the macro eNB 104.

Status Polling by Macro eNB

Figure 5:
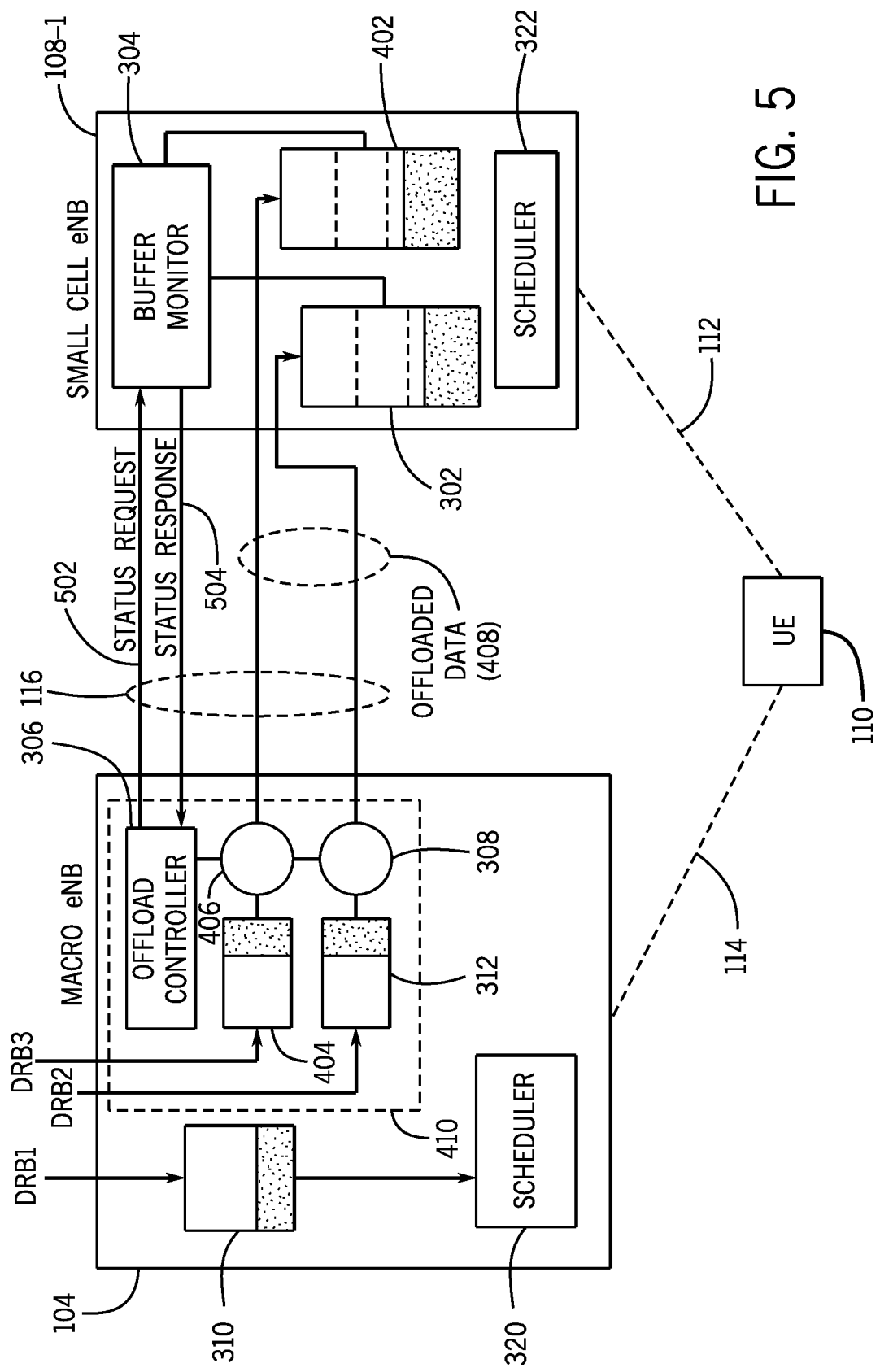

The foregoing examples refer to event-driven status reporting by the small cell eNB 108-1 to the macro eNB 104 in response to a detected condition that may degrade communication of offloaded data. In alternative examples, as shown in FIG. 5, a request-response technique can be used, in which the offload controller 306 of the macro eNB 104 sends (over the backhaul link 116) a status request message (502) to the buffer monitor 304 of the small cell eNB 108-1 to inquire about the offload data buffer status in the small cell. In response to the status request message (502), the buffer monitor 304 sends a status response message (504) to the offload controller 306 to provide the requested status information to the macro eNB 104. The status response message (504) can be in the form of any of the status indication messages discussed above, for example. The status polling can be on a per radio bearer basis, per radio bearer group basis, per UE basis, or per small cell basis.

The polling can inquire about the status in either or both the uplink and downlink directions.

In some examples, the status request message (502) can include one or more of the following:
UE identifier; and
Radio bearer identifier or radio bearer group identifier.
The status response message (504) can include one or more of the following:
UE identifier;
Buffer status;
Small cell radio resource usage;
Small cell hardware resource usage; and
Wireless link quality.

UE-Assisted Offload Control

Figure 6:
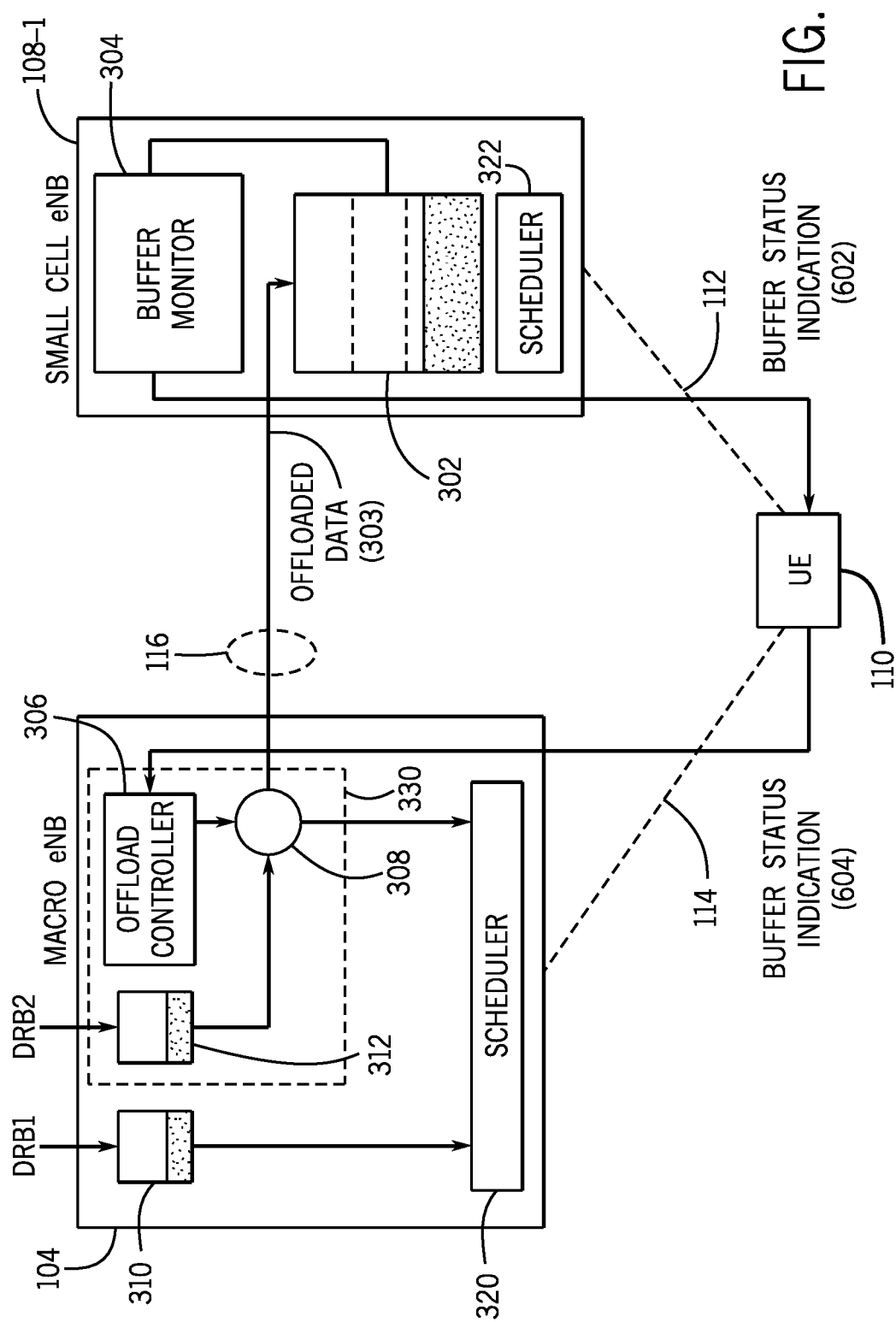

In some scenarios where the latency of the backhaul link 116 is higher, it may be beneficial to relay the small cell data buffer status to the macro eNB 104 via a UE, such as the UE 110 shown in FIG. 6. In this case, when a data buffer in the small cell eNB 108-1 corresponding to the UE 110 exceeds a specified threshold, the small cell eNB 108-1 can send a buffer status indication message (602) to the UE 110, and the UE 110 then relays the buffer status indication message (604) to the macro eNB 104. In another example, this can also be used for the uplink congestion control indication. When the UE determines that the uplink data buffer with a certain small cell is congested (e.g. the usage of the uplink data buffer is above a certain threshold), the UE can indicate this status to the macro cell directly and the macro cell may switch the UE to another small cell.

In some examples, the UE 110 can also send an indicator along with the buffer status indication message 604. The indicator is set to a first value to signify that the UE 110 prefers to connect with the small cell eNB 108-1, and the indicator is set to a second, different value to signify that the UE 110 has no preference in connecting to the small cell eNB 108-1 or macro eNB 104. The UE 110 may set the indicator to indicate preference for connection to the small cell for a variety of reasons, such as to achieve power saving on the uplink, use favorable channel conditions between the small cell eNB 108-1 and the UE 110, to take advantage of sensed low mobility of the UE 110, and so forth.

Data Offload Control Over Macro Cell Air Interface

In some examples, communication of a buffer status or other condition (e.g. radio resource usage or wireless link quality) between the small cell eNB 108-1 and the macro cell 104 can be over a wireless backhaul link. This can be accomplished if the small cell eNB 108-1 is within the coverage area of the macro eNB 104. The small cell eNB 108-1 can establish a wireless connection with the macro eNB 104 at a serving frequency of the macro eNB 104.

Communicating over a wireless connection between the small cell eNB 108-1 and the macro eNB 104 can reduce communication latency between the small cell and the macro cell in deployments where the wired backhaul link is relatively slow.

Dynamic Load Sharing Between Macro Cell and Small Cell

The foregoing assumes that all data packets of a given radio bearer are communicated either by a macro eNB or a small cell eNB. In other implementations, the data packets of one radio bearer may be distributed across the macro eNB and one or more small cell eNBs. In other words, a data packet of the radio bearer may be selectively transmitted by either the macro eNB or a small cell eNB. The decision to send a particular data packet by the macro eNB or small cell eNB may be based on one or more factors, such as radio or hardware resource usage status of a small cell, the data buffer status of the small cell, or the wireless link condition of the small cell for a UE.

Distributing data packets of one radio bearer through multiple cells can result in data packets arriving out of order at the UE, especially if there is a relatively large latency on the backhaul link 116. To address out-of-order data packets of a given radio bearer, the UE's packet reordering buffer may be increased in size to allow the UE to wait for data packets to be received from the different cells. In addition, the sequence number field of the packets are properly sized to accommodate the increased buffer size such that packets stored in the buffer have different packet numbers.

Load Sharing in Case Small Cell Also Serving Single-Connection UEs

In practice, a small cell may handle both offloaded data from a macro cell as well as traffic for single-connection UEs (e.g. legacy UEs or very low mobility UEs which do not have to connect to the macro cell for mobility robustness) that are connected to the small cell only (i.e. without a concurrent connection to a macro cell). In this case, the small cell can reserve some resources for single-connection UEs served by the small cell. For example, even if there is no active single-connection UE in the small cell, the small cell can specify that resource usage for offloaded traffic is not to exceed a specified threshold (e.g. resource usage should not exceed a specified percentage of small cell resources). This is to ensure that the small cell has sufficient resources to handle traffic for any single-connection UEs. The small cell may put single connection UE to have higher resource priority than the offloading UE.

To facilitate load sharing between macro and small cells, a small cell can report resource usage for offloaded traffic as well as resource usage for traffic of single-connection UE(s) served by the small cell. The small cell can also inform the macro cell of the maximum resource usage (radio resource usage, or hardware resource usage, or both) the small cell allows for offloaded data and the maximum resource usage the small cell allows for traffic of single-connection UE(s). For example, the small cell can provide the PRB usage for offloaded data as follows:

Percentage of PRB usage by downlink offloaded data;
Percentage of PRB usage by uplink offloaded data;
Percentage of PRB usage by downlink traffic of single-connection UE(s) served by the small cell; and
Percentage of PRB usage by uplink traffic of single-connection UE(s) served by the small cell.

The foregoing PRB usage information can be included in a modified Radio Resource Status information element in an X2 RESOURCE STATUS UPDATE message, for example.

Alternatively, the small cell can make autonomous decisions using an admission control mechanism (based on any of the foregoing percentages) to allow, negotiate or reject data offloading without informing the macro cell of the maximum resource usage allowed for offloaded data. Note that potentially there may be data offloads from multiple macro cells to one small cell.

Splitting of User Plane Protocol Stack

Offloading data from a macro cell to a small cell is accomplished by splitting a user plane protocol stack between the macro eNB 104 and the small cell eNB 108-1. A user plane protocol stack can include various protocol layers, including a PDCP layer, RLC layer, MAC layer, and physical layer. These protocol layers can be included in the macro eNB 104. Some of these protocol layers can also be included in the small cell eNB 108-1. Which protocol layers are included in the small cell eNB 108-1 depends on where a user plane protocol stack is split in the macro eNB 104. Splitting a user plane protocol stack at a given point results in multiple user plane paths, with one user plane path through the macro eNB 104 and another user plane path through the small cell eNB 108-1.

A first option to support data offload to small cells may be to split the user plane data before the PDCP layer in the macro eNB 104; in this arrangement, a separate PDCP/RLC/MAC stack is also deployed in the small cell.

Figure 7:
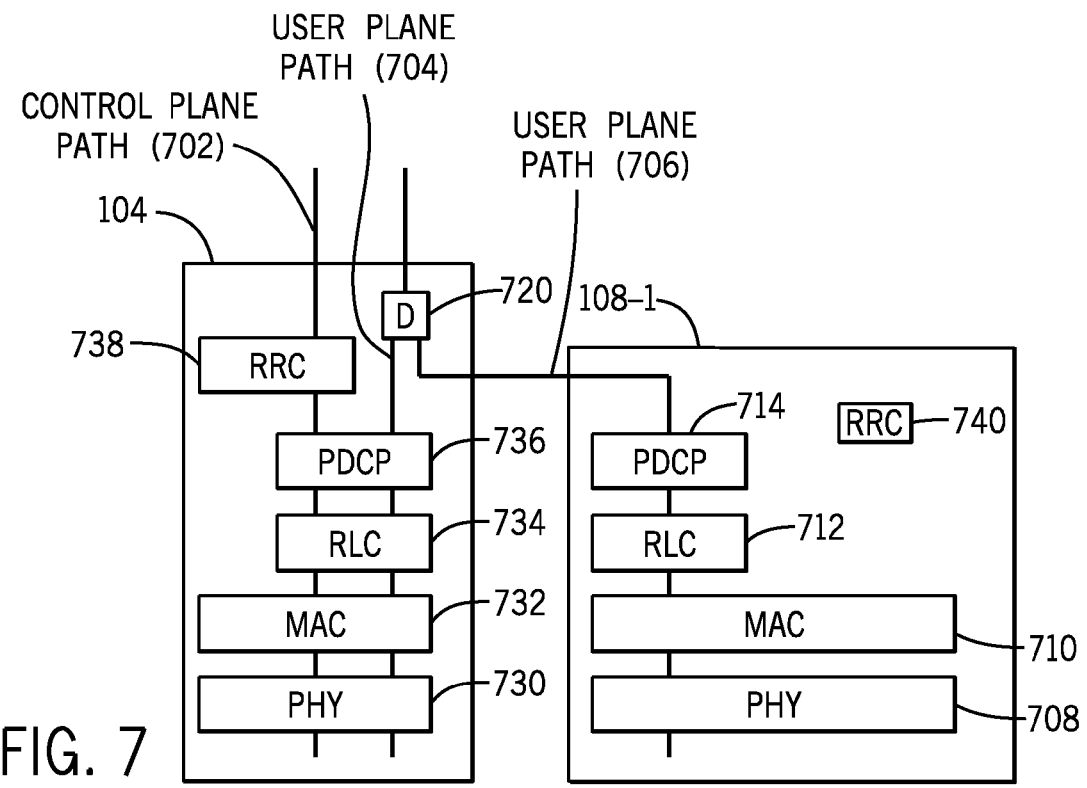
FIGS. 7 and 8 are schematic diagrams illustrating splitting of a user plane protocol stack, according to various examples.

As shown in FIG. 7, the protocol stack in the macro eNB 104 includes a physical layer 730, a MAC layer 732, an RLC layer 734, a PDCP layer 736, and an RRC layer 738. In one example split design, the user plane protocol stack can be split right above the PDCP layer 736 in the macro eNB 104, as shown in FIG. 7. The split occurs at a splitting point right above the PDCP layer 736 in the macro eNB 104. The user plane data is routed to the macro eNB 104 and then split before the PDCP layer 736.

A data distribution logic 720 (which can be part of the offload controller 306 discussed in connection with FIGS. 3-6), may be used at the macro eNB 104 to determine if a radio bearer is to be handled by the macro cell or small cell.

With this split design, the UE 110 is configured to have two separate MAC layers, one that communicates with the macro eNB 104 and the other that communicates with the small cell eNB 108-1.

FIG. 7 shows a signaling path 702, which extends through the RRC layer 738 and the lower layers 736, 734, 732, and 730.

Two user plane paths 704 and 706 (created due to the split above the PDCP layer 736) are also depicted in FIG. 7. The user plane path 704 extends through the PDCP layer 736, RLC layer 734, MAC layer 732, and physical layer 730 in the macro eNB 104. On the other hand, the user plane path 706 extends from the macro eNB 104 through the following protocol layers in the small cell eNB 108-1: PDCP layer 714, RLC layer 712, MAC layer 710, and physical layer 708. By splitting the user plane protocol stack above the PDCP layer 420 in the macro eNB 104, all of the PDCP, RLC, MAC, and physical layers are replicated at the small cell eNB 108-1. In some examples, an RRC layer 740 can also be included in the small cell eNB 108-1 to perform certain RRC functions for radio resource configuration. However, note that the control plane functions are still handled by the macro eNB 104.

Figure 8:
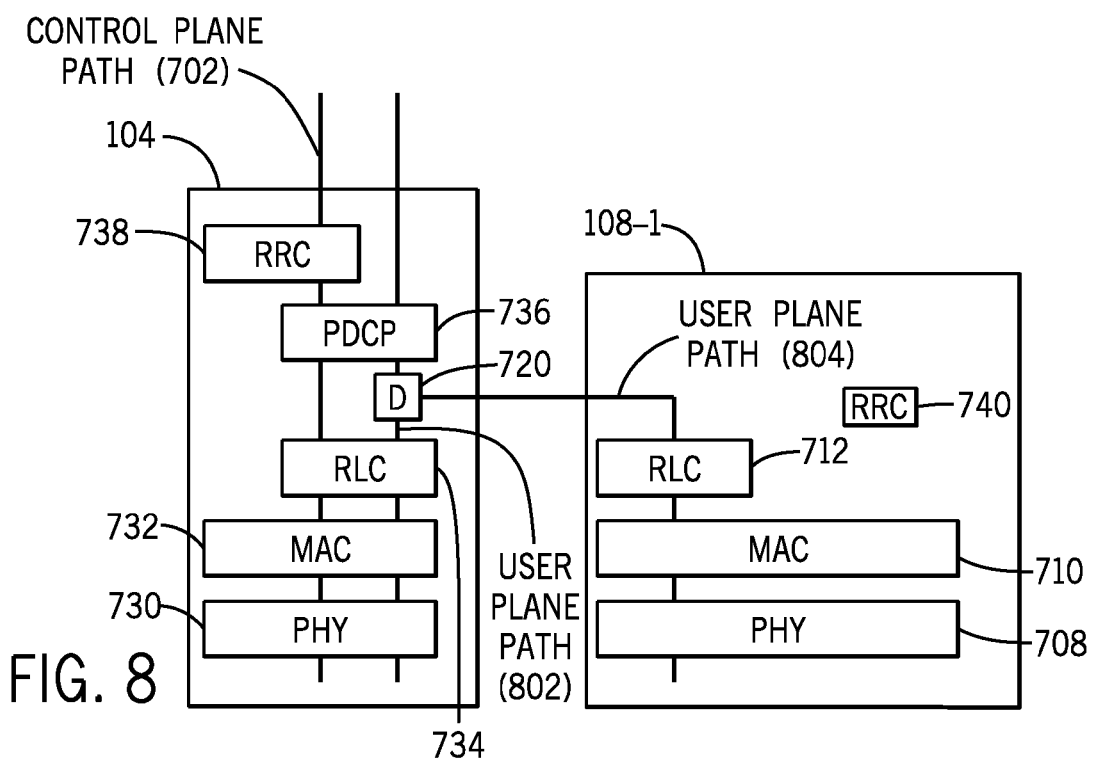

In an alternative second split design, as shown in FIG. 8, the user plane protocol stack can be split right below the PDCP layer 736. The split occurs at a splitting point between the PDCP layer 736 and the RLC layer 734 in the macro eNB 104. In this split design, a single PDCP layer 736 is provided in the macro eNB 104, with no PDCP layer provided in the small cell eNB 108-1. Data going to the small cell is split after the PDCP layer 736.

The data distribution logic 720 can be provided in the macro eNB 104 to determine if a radio bearer is to be handled by the macro eNB 104 or the small cell eNB 108-1.

FIG. 8 depicts a user plane path 802 and a user plane path 804 split below the PDCP layer 736. The user plane path 802 extends from the PDCP layer 736 through the RLC layer 734, MAC layer 732, and physical layer 730 of the macro eNB 104. The user plane path 804 extends from the PDCP layer 736 in the macro eNB 104 through the RLC layer 712, MAC layer 710, and physical layer 708 in the small cell eNB 108-1.

In other examples, the split can occur at lower layers. In another split design, the user plane protocol stack is split right below the RLC layer 734 in the macro eNB 104. The split occurs at a splitting point between the RLC layer 734 and the MAC layer 734 in the macro eNB 104. In this split design, a single PDCP layer 736 and RLC layer 734 are provided in the macro eNB 104. User plane data going to the small cell is split after the RLC layer 734 in the macro eNB 104. As a result, the protocol stack of the small cell eNB 108-1 includes the MAC layer 710 and physical layer 708, without a PDCP layer and RLC layer.

In further examples, the split can occur between the MAC layer 732 and physical layer 730 in the macro eNB 104.

System Architecture

Figure 9:
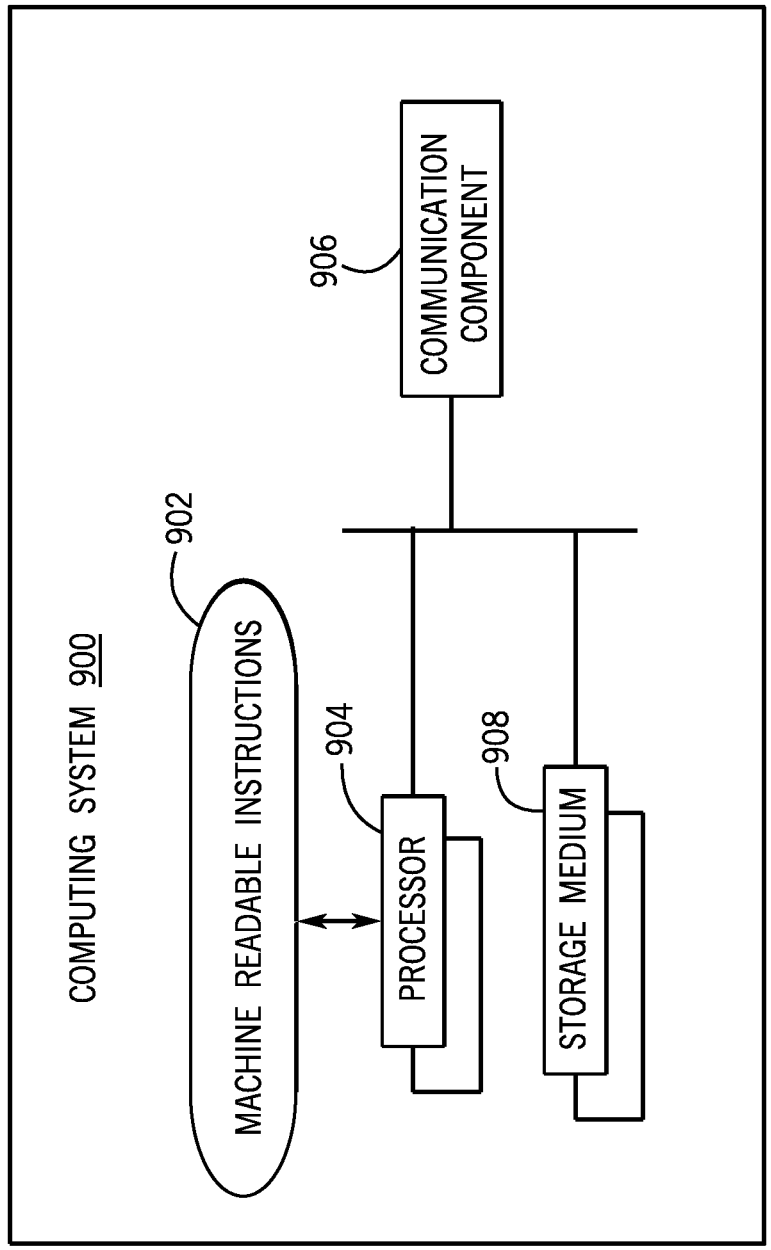
FIG. 9 is a block diagram of an example system that is capable of incorporating some implementations.

FIG. 9 is a block diagram of an example system 900 that can be any of various nodes described above, include a UE, small cell eNB 108-1, and macro eNB 104. The system 900 includes machine-readable instructions 902 that can perform tasks of any of the foregoing entities as discussed above. The machine-readable instructions 902 are executable on one or multiple processors 904. A processor can include a microprocessor, microcontroller, processor module or subsystem, programmable integrated circuit, programmable gate array, or another control or computing device.

The processor(s) 904 can be coupled to one or multiple communication interfaces or components 906, which enable communication between the system 900 and one or more other nodes. Each communication component 906 includes network interface hardware in addition to firmware or software for implementing higher layers (including those protocol layers discussed above). The system 900 also includes a storage medium (or storage media) 908 to store data and instructions.

The storage medium (or storage media) 908 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving, by a first wireless access network node, feedback information from a second wireless access network node that performs data offload for the first wireless access network node, the feedback information relating to a buffer condition of a data buffer in the second wireless access network node, and the feedback information comprising a radio bearer identifier identifying a radio bearer associated with data stored in the data buffer;
   in response to the feedback information, performing, by the first wireless access network node, control of the data offload for the radio bearer identified by the radio bearer identifier in the feedback information, the controlling comprising pausing communication of offloaded data associated with the data offload for the radio bearer from the first wireless access network node to the second wireless access network node;
   in response to the pausing of communication of offloaded data associated with the data offload for the radio bearer, starting a timer at the first wireless access network node; and
   in response to expiration of the timer, transfer, by the first wireless access network node, the radio bearer from the second wireless access network node to a third wireless access network node.

2. The method of claim 1, wherein the data offload is for downlink data for transmission to a user equipment.

3. The method of claim 1, wherein receiving the feedback information comprises receiving, by the first wireless access network node of a macro cell, the feedback information from the second wireless access network node of a small cell over a link between the first and second wireless access network nodes.

4. The method of claim 1, wherein receiving the feedback information relating to the buffer condition comprises receiving information relating to an amount of usage of the data buffer in the second wireless access node.

5. The method of claim 1, wherein the feedback information further comprises information relating to a portion of physical radio resources of the second wireless access network node that are occupied.

6. The method of claim 5, wherein the physical radio resources are occupied by offloaded downlink data.

7. The method of claim 1, wherein the feedback information further comprises information relating to radio resource usage over a period of time.

8. The method of claim 1, wherein the feedback information further comprises one or more of a downlink modulation and coding indicator, a downlink received signal strength indicator, a downlink received signal to interference plus noise ratio, or an indicator related to an estimated error rate.

9. The method of claim 1, further comprising:
   sending, by the first wireless access network node to the second wireless access network node, a status request, wherein the feedback information is sent by the second wireless access network node in response to the status request.

10. The method of claim 1, wherein receiving the feedback information comprises receiving the feedback information relayed by a user equipment from the second wireless access network node.

11. The method of claim 1, wherein receiving the feedback information comprises receiving the feedback information wirelessly from the second wireless access network node.

12. The method of claim 1, further comprising:
   performing, by the first wireless access network node, load sharing of traffic for a user equipment by distributing packets of a radio bearer for the user equipment between at least the first wireless access network node and the second wireless access network node.

13. The method of claim 1, further comprising:
receiving, by the first wireless access network node, an indication of a maximum amount of resources allowed for offloaded data at the second wireless access network node, the resources including at least one of radio resources and hardware resources.

14. The method of claim 1, further comprising:
resetting the timer in response to receiving further feedback information from the second wireless access network node; and
in response to the further feedback information, resuming sending, by the first wireless access network node, offloaded data associated with the data offload for the radio bearer to the second wireless access network node.

15. A first wireless access network node comprising:
a data buffer;
a communication interface to communicate with a second wireless access network node; and
at least one processor configured to:
send, for receipt by the second wireless access network node, feedback information related to data offload from the second wireless access network node to the first wireless access network node, wherein the feedback information is sent in response to at least one criterion being satisfied, the feedback information relating to a buffer condition of the data buffer and comprising a radio bearer identifier identifying a radio bearer associated with data stored in the data buffer, wherein the at least one criterion relates to a threshold associated with usage of the data buffer, the feedback information to cause the second wireless access network node to control the data offload for the radio bearer identified by the radio bearer identifier in the feedback information, the controlling comprising pausing communication of offloaded data associated with the data offload for the radio bearer from the second wireless access network node to the first wireless access network node;
after the pausing of communication of offloaded data associated with the data offload for the radio bearer from the second wireless access network node to the first wireless access network node:
send further feedback information to the second wireless access network node; and
responsive to the further feedback information, resume receiving communication of offloaded data associated with the data offload for the radio bearer from the second wireless access network node.

16. The first wireless access network node of claim 15, wherein the at least one processor is configured to send the feedback information in response to the usage of the data buffer exceeding the threshold.

17. The first wireless access network node of claim 15, wherein the at least one processor is configured to perform data offloading on behalf of the second wireless access network node for data communication with a user equipment.

18. The first wireless access network node of claim 17, wherein the data offloading is for one or both of downlink data and uplink data.

19. A first wireless access network node comprising:
at least one processor; and
a non-transitory storage medium storing instructions executable on the at least one processor to:
receive feedback information from a second wireless access network node that performs data offload for the first wireless access network node, the feedback information relating to a buffer condition of a data buffer in the second wireless access network node, and the feedback information comprising a radio bearer identifier identifying a radio bearer associated with data stored in the data buffer;
in response to the feedback information, perform control of the data offload for the radio bearer identified by the radio bearer identifier in the feedback information, the controlling comprising pausing communication of offloaded data associated with the data offload for the radio bearer from the first wireless access network node to the second wireless access network node;
in response to the pausing of communication of offloaded data associated with the data offload for the radio bearer, start a timer at the first wireless access network node; and
in response to expiration of the timer, transfer the radio bearer from the second wireless access network node to a third wireless access network node.

20. The first wireless access network node of claim 19, wherein the instructions are executable on the at least one processor to further:
reset the timer in response to receiving further feedback information from the second wireless access network node; and
in response to the further feedback information, resume sending offloaded data associated with the data offload for the radio bearer to the second wireless access network node.

* * * * *